United States Patent
Homer et al.

(10) Patent No.: US 8,460,013 B2
(45) Date of Patent: Jun. 11, 2013

(54) DETECTION OF IMPROPERLY SEATED ELECTRONIC COMPONENT

(75) Inventors: Steven S. Homer, Tomball, TX (US); Earl W. Moore, Cypress, TX (US); Ronald E. Deluga, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 329 days.

(21) Appl. No.: 12/812,617

(22) PCT Filed: Jan. 30, 2008

(86) PCT No.: PCT/US2008/052485
§ 371 (c)(1),
(2), (4) Date: Jul. 13, 2010

(87) PCT Pub. No.: WO2009/096962
PCT Pub. Date: Aug. 6, 2009

(65) Prior Publication Data
US 2010/0291778 A1    Nov. 18, 2010

(51) Int. Cl.
*H01R 12/00* (2006.01)
*H01R 13/62* (2006.01)

(52) U.S. Cl.
USPC .............................. 439/78; 439/326

(58) Field of Classification Search
USPC ..................... 439/188, 326–329
See application file for complete search history.

(56) References Cited

U.S. PATENT DOCUMENTS

| | | | | |
|---|---|---|---|---|
| 3,216,580 A | * | 11/1965 | Fricker, Jr. | 211/41.17 |
| 4,952,758 A | * | 8/1990 | Dara et al. | 200/51.09 |
| 5,260,852 A | * | 11/1993 | Ma | 361/679.37 |
| 5,530,376 A | | 6/1996 | Lim et al. | |
| 5,627,416 A | * | 5/1997 | Kantner | 307/119 |
| 5,695,354 A | * | 12/1997 | Noda | 439/326 |
| 5,779,494 A | * | 7/1998 | Ito et al. | 439/326 |
| 5,791,925 A | * | 8/1998 | Yu | 439/326 |
| 5,820,391 A | * | 10/1998 | Delprete et al. | 439/91 |
| 5,847,932 A | * | 12/1998 | Kantner | 361/737 |
| 6,162,069 A | * | 12/2000 | Choy | 439/92 |
| 6,164,998 A | * | 12/2000 | Poi et al. | 439/326 |
| 6,244,881 B1 | * | 6/2001 | Hara | 439/188 |
| 6,270,369 B1 | * | 8/2001 | Kato et al. | 439/326 |
| 6,452,114 B1 | * | 9/2002 | Schweitzer et al. | 174/261 |

(Continued)

FOREIGN PATENT DOCUMENTS

| | | |
|---|---|---|
| JP | 08083631 | 3/1996 |
| JP | 09097540 | 4/1997 |
| JP | 2000200641 | 7/2000 |
| KR | 10199910248 | 2/1999 |

OTHER PUBLICATIONS

International Search Report and Written Opinion of the International Searching Authority dated Sep. 17, 2008, pp. 10.

*Primary Examiner* — Briggitte R Hammond

(57) ABSTRACT

A system comprises a circuit board, a pair of electrically-conductive board contacts mounted on the circuit board, and a connector assembly coupled to the board and adapted to receive an electrical component. The connector assembly has a pair of deflectable arms. Each deflectable arm comprises a conductive arm contact. Inserting the electrical component into the connector causes the deflectable arms to be deflected from a resting position and away from said electrical component thereby preventing the board contacts from electrically contacting the arm contacts. When the electrical component is fully seated in the connector, the deflectable arms revert back to the resting positioning thereby causing the arm contacts to electrically contact the board contacts.

11 Claims, 3 Drawing Sheets

U.S. PATENT DOCUMENTS

| | | | |
|---|---|---|---|
| 6,464,514 B1 * | 10/2002 | Tsai et al. | 439/92 |
| 6,826,638 B1 * | 11/2004 | Jaggers et al. | 710/300 |
| 6,943,739 B1 | 9/2005 | Rousu et al. | |
| 7,074,067 B2 * | 7/2006 | Yang et al. | 439/326 |
| 2004/0186688 A1 | 9/2004 | Nejedlo | |
| 2004/0217651 A1 | 11/2004 | Brown et al. | |
| 2004/0227637 A1 | 11/2004 | Barr et al. | |
| 2011/0171846 A1 * | 7/2011 | Bauer et al. | 439/326 |

* cited by examiner

DETECTION OF IMPROPERLY SEATED ELECTRONIC COMPONENT

BACKGROUND

Many computer systems permit electronic components to be installed by a user of the system. Examples of such electronic components include memory modules, add-in circuit boards, etc. It is possible that a user only partially, not fully, seats the electronic component in place in the system. It is also possible that the user believes he or she has fully seated the electronic component in place, and thus not realize that the component is only partially seated. A component that is only partially seated will likely not work properly or at all.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
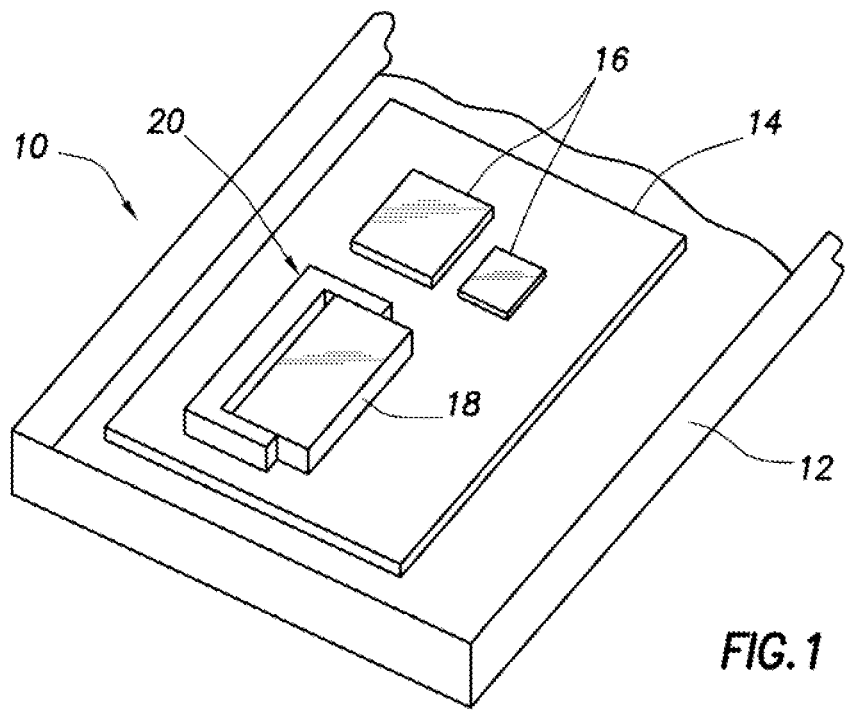
FIG. 1 shows a system comprising a connector assembly in accordance with various embodiments for detecting a partially seated electronic component.

FIG. 1 illustrates a computing system 10 in accordance with various embodiments. Computing system 10 may comprise a computer such as a desktop or notebook computer, or other type of electronic system. As shown, the system 10 comprises a chassis 12 that contains a circuit board 14. In some embodiments, the circuit board 14 represents the "system" or "mother" board and, as such, contains one or more semiconductor devices 16 such as a processor, memory, etc.

The system 10 of FIG. 1 also comprises an electronic component 18 adapted to be mated to, and removed from, a connector assembly 20. The electronic component 18 may comprise any of variety of components such as a memory module, add-in card, etc. The connector assembly 20 is generally C-shaped and contains an electrical connector (not shown in FIG. 1) that mates to a corresponding electrical connector (also not shown in FIG. 1) on the electronic component 18. The connector assembly 20 may be mounted on circuit board 14 or otherwise mechanically and/or electrically coupled to the circuit board.

Figure 2:
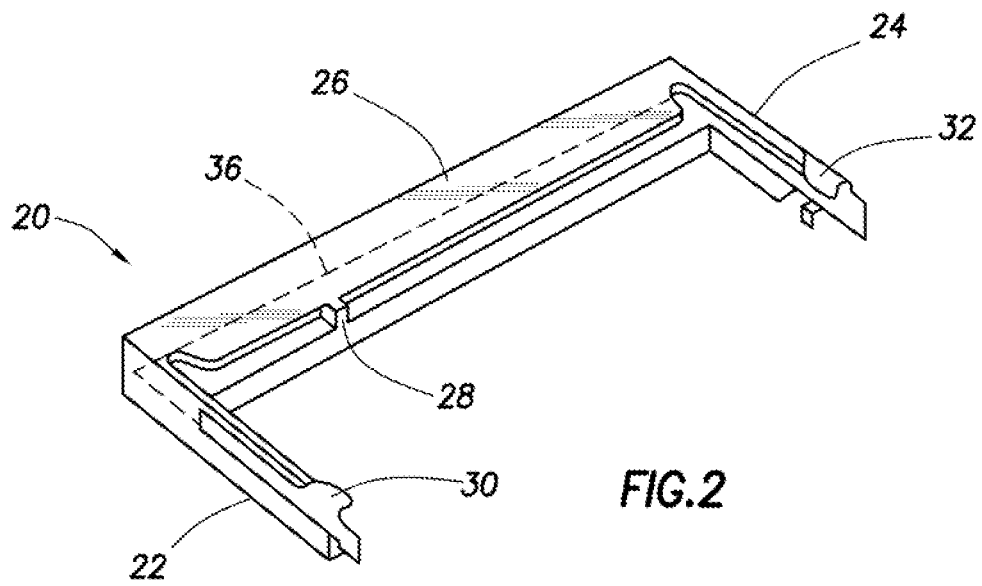
FIG. 2 shows the connector assembly in accordance with various embodiments.

FIG. 2 shows a perspective view of the connector assembly 20. Connector 28 is shown which receives a corresponding connector from electronic component 18. The assembly 20 comprises a connector body 26 and a pair of arms 22, 24. In at least some embodiments, the arms 22, 24 and the body 26 are molded as one unitary piece. In other embodiments, the arms 22, 24 are separate from, but coupled to, the body 26 by for example, adhesive, a hinge, etc. The arms 22, 24 generally extend away from the body 26 at, or approximately, a 90 degree angle so as to provide the connector assembly its C-shape. The arms 22, 24 are shown in FIG. 2 in their natural resting position. Each arm comprises a protruding member 30, 32 as shown. Each protruding member 30, 32 extends inward toward the other arm. Each protruding member may be electrically conductive or non-conductive.

Figure 3A:
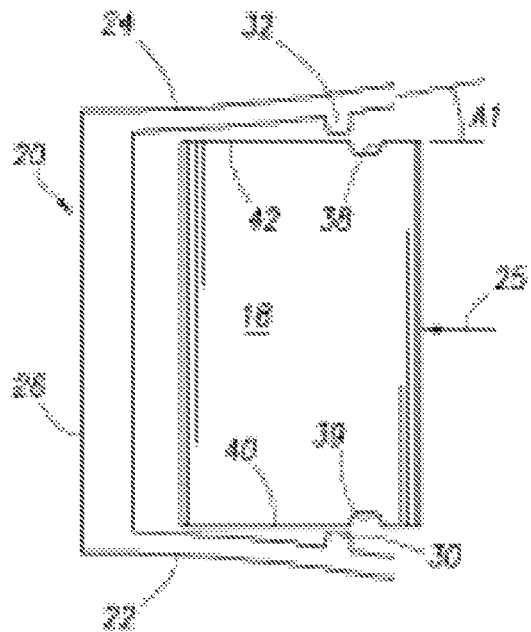
FIGS. 3a and 3b illustrate partially and fully seated electronic components in accordance with various embodiments.
Figure 3B:
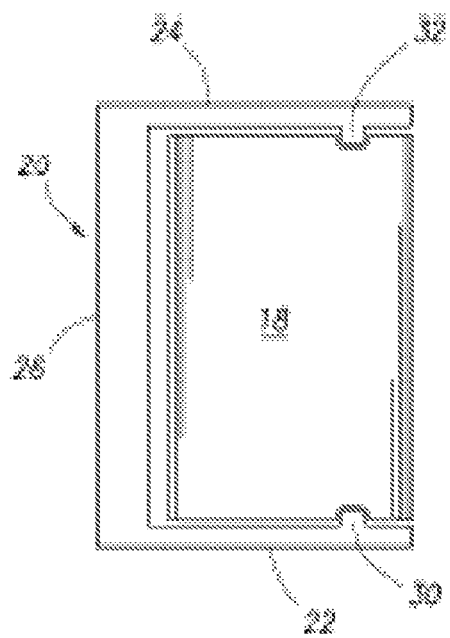

The arms 22, 24 are deflectable meaning that outward force on an arm will cause that arm to be bent outward to a degree without breaking or otherwise separating from connector body 26. The degree to which each arm can be deflected outward without breaking is at least just enough to permit the electronic component 18 to be mated to the connector assembly. The flexible nature of arms 22, 24 to accommodate insertion of electronic component 18 is illustrated in FIGS. 3a and 3b. FIG. 3a illustrates the partial insertion of the electronic module into the connector assembly 20. The electronic component 18 comprises a pair of recessed areas 39 and 38 that generally coincide with the arms' protruding members 30 and 32. As a user slides the electronic component 18 into the connector assembly 20 between the arms 22, 24 (in the direction of arrow 25), the sides 40 and 42 of the electronic component are contacted by the arm's protruding members 30, 32 and thereby force the arms to deflect outward as shown. Each arm 22, 24 is deflected outward at an angle A1 that varies as the electronic component 18 is slid into place to mate with connector assembly 20. The material selected from which to fabricate the connector assembly and, in particular, the arms 22, 24 is such that the arms can be deflected outward to an angle of at least A1 without breakage.

FIG. 3b illustrates that the electronic component 18 is fully seated in connector assembly 20 thereby establishing electrical connectivity between the electronic component 18 and connector assembly 20. Upon establishing electrical connectivity between electronic component 18 and connector assembly 20, protruding members 30, 32 fit into the corresponding recessed areas 38, 39, thereby permitting the arms to revert back to their natural resting state.

As illustrated by FIGS. 3a and 3b, the arms 22, 24 can be forced apart to permit the electronic component 18 to be inserted into and mated to the connector assembly 20. The arms are forced away from their natural resting position and, due do the spring-like nature of the arms, the arms revert back to their resting position when the protruding members 30, 32 are able to fit into the corresponding recess areas 38, 39. This occurs when the electronic component 18 is fully seated in the connector assembly 20. When the electronic component 18 is only partially seated in the connector assembly 20, the arms 22, 24 are pushed apart as shown in FIG. 3a. In accordance with various embodiments, a sensing mechanism is provided to detect when the arms are not in their natural resting position, which is indicative of the electronic component 18 not being fully seated. The sensing mechanism thus differentiates between an electronic component 18 being fully versus partially seated.

Figure 4:
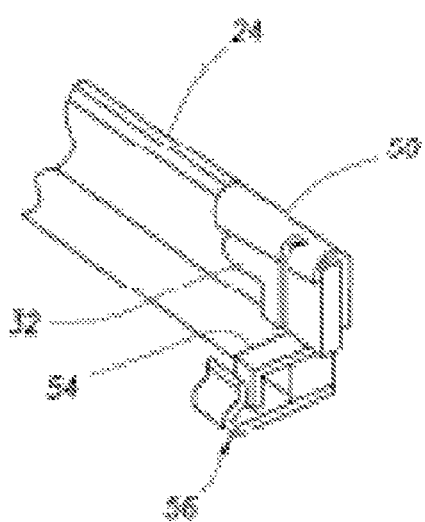
FIG. 4 shows a perspective view of a portion of the connector assembly in accordance with various embodiments.
Figure 5:
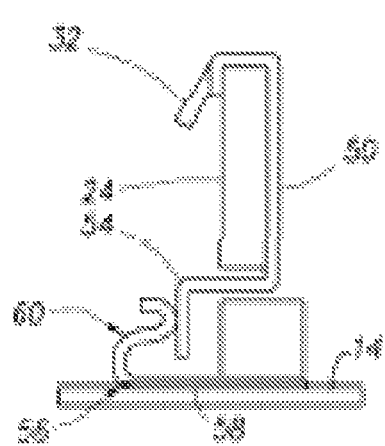
FIG. 5 shows a plan view of the portion of the connector assembly of FIG. 4 in accordance with various embodiments.

FIGS. 4 and 5 illustrate an embodiment of such a sensing mechanism. FIG. 4 depicts the distal end of arm 24 away from body 26. The end of the other arm 22 is similarly configured. As shown, the arm 24 comprises an electrically conductive contact 50 wrapped partially or fully around the arm. The protruding member 32 is part of the contact 50 or may be a separate component. Because the conductive contact 50 is provided on the arm 24, the conductive contact 50 is referred to herein as an "arm contact." The arm contact 50 comprises a portion 54 that extends away from the arm 24 as shown. The conductive extension 54 of the arm contact 50 is bent at a right angle as shown, or can be formed into other shapes as desired, or not bent at all. The arm contacts 50 are electrically connected via a conductor 36 that is provided in, or on, the connector assembly 20. The conductor 36 passes through, or on, the arms 22, 24 and body 26.

Another electrical contact 56 is coupled to the circuit board 14. In some embodiments, the contact 56 is mounted directly onto the board 14, but in other embodiments, the contact 56 is mounted elsewhere but electrically coupled to circuitry on the board 14. This contact is referred to as a "board contact" (regardless of whether or not the contact is mounted directly on board 14). The board contact has a generally double-curved shape as shown. Each board contact 56 comprises a base portion 58 and spring portion 60. Portions 58 and 60 may be formed as a unitary structure or separate structures attached together (e.g., glued, welded, etc.). When the electronic component is fully seated in connector assembly 20, the arms 22, 24 revert back to their natural resting state which thereby causes the electrically-conductive arm contact 50 (specifically extension portion 54) to contact the electrically conductive board contact 56. If the electronic component 18 is not fully seated, then one or both of the arms 22, 24 remain in the outwardly deflected state (best shown in FIG. 3a). As such, the contacts 50, 56 associated with the arm(s) that remains deflected will not be in electrical contact with each other.

Figure 6:
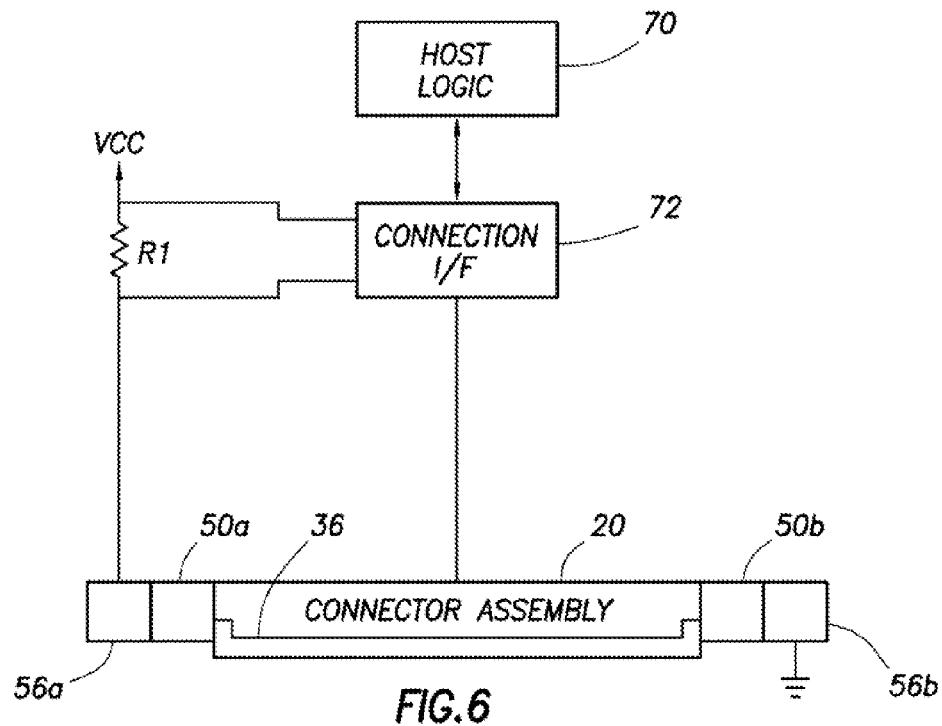
FIG. 6 illustrates an electrical schematic of the system in accordance with various embodiments.

FIG. 6 illustrates an electrical schematic of at least a portion of the computer system 10. Arm contacts 50a and 50b are depicted on either side of the connector assembly 20 (the arms 22, 24 are not specifically shown). The board contacts 56a and 56b are also shown in electrical contact with the arm contacts 50a, 50b. Electrical contact between arm and board contacts 50, 56 is established as shown only if the electronic component 18 is fully seated as explained above. Board contact 56b is grounded and board contact 56a is connected to a resistor R1 which, in turn, is connected to a voltage source VCC. A connector interface 72 is also provided which receives the voltage across resistor R1. The connector interface causes the connector assembly to be electrically and/or logically disconnected from the system 10 under the control of the host logic 70. The host logic 70 may comprise a processor or other type of circuit in the system 10. In some embodiments, the connector interface 72 is part of the host logic 70. The connector interface 72 asserts a digital signal to the host logic based on whether the electronic component 18 is fully seated. This determination is made based on the voltage across resistor R1. If the electronic component is fully seated, the board contact 56a is at the ground potential via conductor 36 (also shown in FIG. 2) and via arm contact 50b and board contact 56b which are connected together with board contact 56b being grounded as shown. The voltage across resistor R1 is VCC (e.g., 3 VDC) and the connector interface 72 interprets that voltage as a logic high.

If, however, the electronic component 18 is not fully seated, then board contact 56a will not be grounded as one or both of the pairs of arm and board contacts 50, 56 will not be in electrical contact with each other. In this case (board contact 56a not being grounded by way of board contact 56b), resistor R1 will not be connected to ground and no current will flow through resistor R1. As no current flows through resistor R1, the VCC voltage is not provided across resistor R1. The connector interface 72 detects this state of resistor R1 as a logic low.

The connector interface 72 informs the host logic 70 as to whether the electronic component 18 is fully seated. If the host logic 70 is informed by the connector 72 that the electronic component 18 is not fully seated, the host logic 70 takes appropriate action. The action could be to prevent power from being provided to the connector assembly 20, to prevent data communications with the electronic component, to generate an alert (e.g., audible or visual), or other suitable actions.

Figure 7:
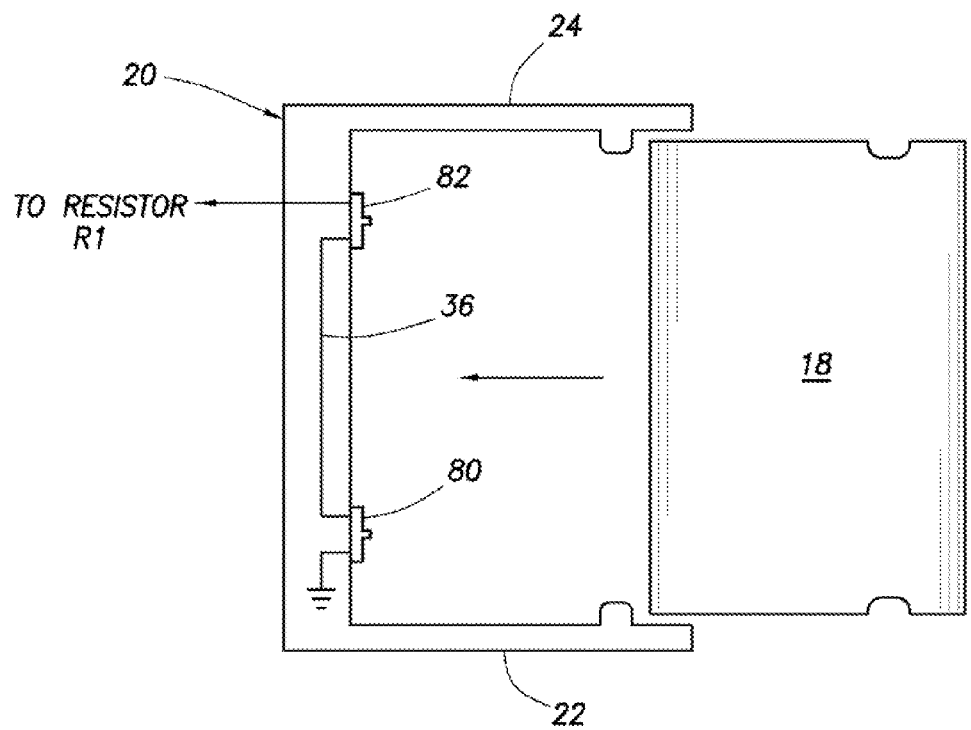
FIG. 7 shows an alternative embodiment of a mechanism to detect a partially-seated electronic component.

FIG. 7 shows another type of sensing mechanism to detect a partially seated electronic component 18. In this embodiment, the connector assembly 20 comprises a pair of switches 80 and 82 provided at opposing ends of connector assembly body 26 and interconnected via conductor 36. One switch (e.g., switch 80) is grounded and the other switch (e.g., switch 82) is connected to resistor R1. The switches are arranged so that when the electrical module is fully seated in the connector assembly 20, both of the switches are closed by the electrical module. The switches 80, 82 are electro-mechanical switches. In some embodiments, the switches 80, 82 are normally-open switches that are closed upon the electronic component being fully seated in the connector assembly 20. If the electronic component is not fully seated, one or more both of the switches 80, 82 will not be closed. The switches 80, 82 are connected to the connector interface 72 in much the same way as depicted in FIG. 6 and explained above regarding board contacts 56.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
    a circuit board;
    a pair of electrically-conductive board contacts coupled to said circuit board; and
    a connector assembly coupled to said board and adapted to receive an electrical component, said connector assembly having a pair of deflectable arms, each deflectable arm comprising an electrically-conductive arm contact;
    wherein, inserting the electrical component into said connector causes said deflectable arms to be deflected from a resting position and away from said electrical component thereby preventing said board contacts from electrically contacting said arm contacts, and when said electrical component is fully seated in said connector, said deflectable arms revert back to the resting positioning thereby causing the arm contacts to electrically contact said board contacts.

2. The system of claim 1 further comprising logic coupled to said board contacts that determines when said board contacts are shorted together.

3. The system of claim 2 wherein said logic precludes said electrical component from communicating with said system if said logic determines that said board contacts are not shorted together.

4. The system of claim 1 wherein said arm contacts are electrically connected together through said connector assembly.

5. The system of claim 4 further comprising logic coupled to said board contacts that determines when said arm contacts are shorted together.

6. The system of claim 1 wherein said board contacts comprise a base portion affixed to the circuit board and a spring portion against which an arm contact presses when said electrical component is fully seated.

7. The system of claim 6 wherein said spring portion extends upward from said circuit board.

8. The system of claim 1 wherein each board contact comprises a portion that contacts an arm contact, said portion having a double curved shape.

9. The system of claim 1 wherein each deflectable arm extends at a 90 degree angle away from a portion of the connector assembly to which the electrical component electrically mates, and wherein said arm contacts extend only along an outer surface of at least a portion of said arms.

10. The apparatus of claim 1 wherein each arm contact comprises a first portion that extends along said deflectable arm and a contacting portion that extends away from said deflectable arm toward the other deflectable arm.

11. The apparatus of claim 1 wherein the electrical component is a removable memory module.

* * * * *